US005766679A

United States Patent [19]
Siemensmeyer et al.

[11] Patent Number: 5,766,679
[45] Date of Patent: Jun. 16, 1998

[54] CHIRAL NEMATIC POLYESTERS

[75] Inventors: Karl Siemensmeyer, Frankenthal; Frank Meyer, Ludwigshafen; Karl-Heinz Etzbach, Frankenthal; Hans R. Kricheldorf; Nicolas Probst, both of Hamburg, all of Germany

[73] Assignee: BASF Aktiengesellschaft, Ludwigshafen, Germany

[21] Appl. No.: 894,158

[22] PCT Filed: Feb. 13, 1996

[86] PCT No.: PCT/EP96/00602

§ 371 Date: Aug. 15, 1997

§ 102(e) Date: Aug. 15, 1997

[87] PCT Pub. No.: WO96/25449

PCT Pub. Date: Aug. 22, 1996

[30] Foreign Application Priority Data

Feb. 15, 1995 [DE] Germany ......................... 19 504 913.6

[51] Int. Cl.[6] .......................... B05D 5/10; C08G 63/00; C08G 63/44
[52] U.S. Cl. .................... 427/207.1; 528/190; 528/193; 528/219; 528/272; 528/288; 528/289; 528/292; 528/298; 528/300; 528/308; 528/308.6; 528/310; 427/385.5; 427/487
[58] Field of Search .................... 528/272, 288, 528/289, 292, 298, 300, 308, 310, 308.6, 190, 193, 219; 427/487, 207.1, 385.5

[56] References Cited

U.S. PATENT DOCUMENTS

| | | | |
|---|---|---|---|
| 5,011,623 | 4/1991 | Yoshinaga et al. | 252/299.5 |
| 5,032,669 | 7/1991 | Kantor et al. | |
| 5,171,765 | 12/1992 | Jones et al. | 523/415 |
| 5,384,069 | 1/1995 | Yoshinaga et al. | 252/299.01 |
| 5,424,063 | 6/1995 | Cardin et al. | 424/78.08 |

FOREIGN PATENT DOCUMENTS

| | | |
|---|---|---|
| 2938464 A1 | 3/1985 | Germany. |
| 3535547 A1 | 10/1985 | Germany. |
| 4240743 A1 | 11/1994 | Germany. |
| A 95 19578 | 7/1995 | Germany. |
| 1079686 | 8/1967 | United Kingdom. |
| 2166755 | 5/1986 | United Kingdom. |

OTHER PUBLICATIONS

Gray, G.W., Winsor, P.A. and Saupe, A., Liquid Crystals and Plastic Crystals. Ellis Horwood Ltd, Chichester (Classification and Organization of Mesomorphous Phased formed by Non-amphiphilic and Amphiphilic Compounds) pp. 19–63 (1974).

Baessler, H. and Labes, M. M., Helical Twisting Power of Steroidal Solutes in Cholesteric Mesophases, vol. 52, No. 2, pp. 631–637 (1970).

Gali, Giancailo, Laus, Michele, and Angeloni,Annino S., Synthesis and thermotropic properties of new mesogenic diacrylate monomers. Makromol. Chem. 187, pp. 289–295.

Braun, D. and Hempler, P., Grafting of polyesters by free-radical chain transfer, siehe Seite 186, Zeile 16–Seite 188, Zeile 7, Seiten 173–196 (1993).

Storbeck, R., Rehahn, M. and Ballauff, M., Synthesis and properties of high-molecular-weight polyesters based on 1,4:3, 6-dianhydrohexitols and terephthalic acid. Seiten 53–64 (1993).

Heynderickx, I. and Broer, D. J., The Use of Cholesterically- Ordered Polymer Networks in Practical Applications, vol. 202, pp. 113–127 (1991). (Proceedings of the 13th International Liquid Crystal Conference, University of British Columbia, Vancouver Canada, pp. 22–27 (1990).

Kreuzer, F. H. et al., Vorhrag Nr. 7, 22 Arbeitstagung Flussigkristalle, Freiburger, (1993).

Vilasagar, S. and Blumstein A., Molecular Crystals and Liquid Crystals, vol. 56(8), pp. 263–268.

Blumstein, A. et al., Nematic and cholesteric Thermotorpic Polyesters with Azoxybenzene Mesogenic Units and Flexible Spacers in the Main Chain, vol. 20, pp. 877–892 (1982).

Chiellini, E et al., Chiral Liquid Crystal Ploymers, 3. Structurally Ordered Thermotropic Polyesters of Optically Active Propyleneglycol Ethers, Bull. 9, 336–343 (1983).

Park, Ho–Jin et al., Liquid Crystal polymers: 19 Cholesteric main chain polyesters with triad aromatic ester mesogenic units and chiral polyalkylene spacers, vol. 26, pp. 1301–1306 (1985).

Jin, Jung-Il et al., Miscibility of Main–Chain Thermotropic Polyesters, vol. 18, No. 1, pp. 99–101 (1986).

Jin, Jung-Il et al., Main Chain Cholesteric Copolyesters Containing Chiral 3–Methyladiopoyl Moiety in the Spacers, vol. 10, No. 4, pp. 382–388 (1986).

Jin, Jung-Il et al., Thermotropic Compounds having two Terminal Mesogenic Units and Central Spacers. 9. Miscibility between Dimesogenic, Nematic Compounds and Nematic or Cholesteric Polyesters, vol. 10, No. 6, pp. 635–640 (1986).

Cowie, John M.G. and Wu, Hak H., Thermotropic liquid–crystalline main–chain polyesters containing cyclooctylene units, 6, pp. 1511–1516 (1988).

Zuez, V.V. et al., Vysokomol. Soedin., Ser. A, 31(5), pp. 1056–1061 (1989).

Angeloni, A.S. et al., Photochromic liquid–crystalline polymers Main chain and side chain polymers containing anobenezene mesogens, vol. 4, No. 5, pp. 513–527 (1989).

Fujishiro, Koichi and Lenz, Robert W., Main–chain Cholesteric Liquid Crystalline Polyesters with Chiral Pendant Groups. 2. Cholesteric Copolyesters Containing Chiral and Achiral Substituted Hydroquinones, 25, pp. 88–95 (1992).

Fujishiro, Koichi and Lenz, Robert W., Main–chain Cholesteric Liquid Crystalline Polysters with Chiral Pendant Groups. 1. Model Compounds and Polyesters Containing a Chiral Substituted Hydroquinone, 25, pp. 81–87 (1992).

Zuez, V. V. et al., Vysokomol. Soedin., Ser. B, 34(3), pp. 47–54 (1992).

Zuez, V. V. et al., Vysokomol. Soedin., Ser. B, 31(12), pp. 130–132 (1989).

Primary Examiner—Samuel A. Acquah
Attorney, Agent, or Firm—Oblon, Spivak, McClelland, Maier & Neustadt, P.C.

[57] ABSTRACT

Chiral nematic polyesters comprise as alcohol component chiral diol structural units and as acid component dicarboxylic acid residues comprising mesogenic groups. The polyesters are particularly suitable for surface coating.

8 Claims, No Drawings

CHIRAL NEMATIC POLYESTERS

BACKGROUND OF THE INVENTION

1. Field of the Invention

The invention relates to liquid crystalline chiral nematic polyesters comprising as alcohol component chiral diol structural units of the formula

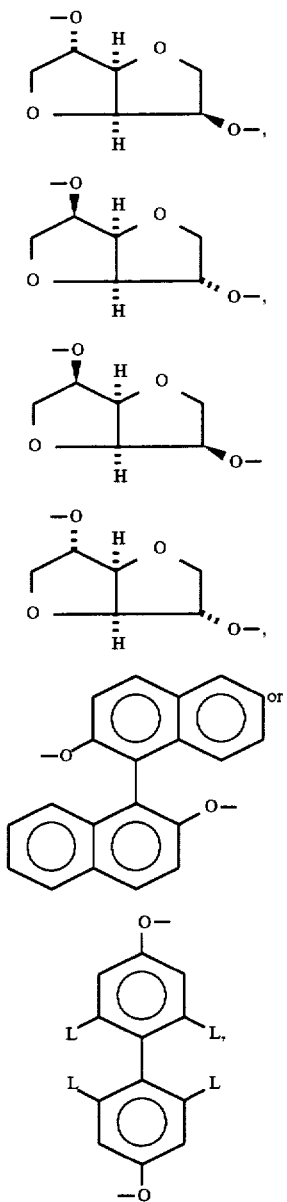

where L is $C_1-C_4$-alkyl, $C_1-C_4$-alkoxy, halogen, COOR, OCOR, CONHR or NHCOR, and R is $C_1-C_4$-alkyl or hydrogen, and as acid component dicarboxylic acid residues comprising mesogenic groups.

The invention furthermore relates to use of the novel polyesters and pigments comprising the chiral nematic polyesters.

2. Description of the Background

Liquid crystalline phases, called mesophases, may occur on heating substances with shape anisotropy. The individual phases differ by the spatial arrangement of the centers of mass of the molecules on the one hand and by the arrangement of the molecules with respect to the long axes on the other hand (G. W. Gray, P. A. Winsor, Liquid Crystals and Plastic Crystals, Ellis Horwood Limited, Chichester 1974). The nematic liquid crystalline phase is distinguished by parallel orientation of the long axes of the molecules (one-dimensional order state). Provided that the molecules forming the nematic phase are chiral, the result is a chiral nematic (cholesteric) phase in which the long axes of the molecules form a helical superstructure perpendicular to it (H. Baessler, Festkörperprobleme XI, 1971). The chiral moiety may be present in the liquid crystalline molecule itself or else be added as dopant to the nematic phase, including the chiral nematic phase. This phenomenon was first investigated on cholesterol derivatives (eg. H. Baessler, M. M. Labes, J. Chem. Phys. 52 (1970) 631).

The chiral nematic phase has special optical properties: a high optical rotation and a pronounced circular dichroism resulting from selective reflection of circularly polarized light within the chiral nematic layer. The colors appear different depending on the angle of view and depend on the pitch of the helical superstructure, which in turn depends on the twisting ability of the chiral component. It is possible in this case, in particular by altering the concentration of a chiral dopant, to vary the pitch and thus the wavelength range of the selectively reflected light of a chiral nematic layer. Chiral nematic systems of this type have interesting possibilities for practical use. Thus, a stable, colored network can be produced by incorporating chiral moieties into mesogenic acrylates and orienting in the chiral nematic phase, eg. after photocrosslinking, but the concentration of chiral component therein can no longer be changed (G. Galli, M. Laus, A. Angelon, Makromol. Chemie 187 (1986) 2289). Admixing noncrosslinkable chiral compounds to nematic acrylates makes it possible to prepare, by photocrosslinking, a colored polymer which still contains large amounts of soluble components (I. Heyndricks, D. J. Broer, Mol. Cryst. Liq. Cryst. 203 (1991) 113). It is furthermore possible, by random hydrosilylation of mixtures of cholesterol derivatives and acrylate-containing mesogens with defined cyclic siloxanes and subsequent photopolymerization, to obtain a chiral nematic network in which the chiral component may form a proportion of up to 50% of the material employed; however, these polymers still contain marked amounts of soluble materials (F. H. Kreuzer, R. Mauerer, Ch. Müller-Rees, J. Stohrer, Contribution No. 7, 22nd Liquid Crystals Meeting, Freiburg, 1993).

DE-A-35 35 547 describes a process in which a mixture of cholesterol-containing monoacrylates can be processed, by photocrosslinking, to chiral nematic layers. However, the total amount of the chiral component in the mixture is about 94%. Although a material of this type, as pure side chain polymer, has not very high mechanical stability, the stability can be increased by highly crosslinking diluents.

Many chiral nematic polyesters in which the mesogenic structures are incorporated into the main chain are also known, eg. from S. Vilasagar, A. Blumstein, Mol. Cryst. Liq. Cryst. (1980), 56 (8), 263–9; A. Blumstein, S. Vilasagar, S. Ponratham, S. B. Clough, R. B. Blumstein, G. Maret, J. Polym. Sci., Polym. Phys. Ed. (1982), 20 (5), 877–92; E. Chielini, G. Galli, C. Malanga, N. Spassky, Polym. Bull. (1983), 9 (6–7), 336–43); H. J. Park, J. I. Jin, R. W. Leng, Polymer (1985), 26 (9), 1301–6; J. I. Jin, E. J. Choi, K. Y. Lee, Polym. J. (1986), 18 (1), 99,101; J. I. Jin, S. C. Lee, S. D. Chi, J. H. Chang; Pollimo (1986), 10 (4), 382–8; J. I. Jin, E. J. Choi, B. W. Jo, Pollimo (1986), 10 (6), 635–40; J. M. G. Cowie, H. H. Wu, Makromol. Chem. (1988), 189 (7), 1511–16; V. V. Zuez, I. G. Denisov, S. S. Skorokhodov, Vysokomol. Soedin., Ser. A (1989, 31 (5), 1056–61; A. S. Angeloni, D. Caretti, C. Carlini, E. Chiellini, G. Galli, A. Altomare, R. Solaro, M. Laus, Liq. Cryst. (1986), 4 (5), 513–27; K. Fujishiro, R. W. Lenz, Macromolecules (1992), 25 (1), 88–95; K. Fuhishiro, R. W. Lenz, Macromolecules (1992), 25 (1), 81–7; V. V. Zuez, I. G. Denisov, S. S. Skorokhodov, Vysokomol. Soedin., Ser. B (1992), 34 (3), 47–54); V. V. Zuez, I. G. Denisov, S. S. Skorokhodov Vysokomol. Soedin., Ser. B (1989), 31 (2), 130–2.

These polyesters mainly contain open-chain chiral components which have low twisting ability, so that relatively large proportions of these components are needed to obtain a color. This limits the choice of the remaining polyester constituents, eg. with respect to their mechanical properties.

Chiral nematic phases can also be obtained by thermal polycondensation of chiral diols with dicarboxylic acids. Alternatively, the chiral moiety can also be incorporated in the dicarboxylic acid unit. The polyesters disclosed to date have, as a rule, very high glass transition temperatures (>170° C.) and only very narrow ranges of existence in the chiral nematic phase. When the transition temperature is reached, the polymers are colored when the amount and type of the chiral component has been chosen suitably. Particularly advantageous chiral components are those resulting in high helical twisting of the liquid crystalline structure, so that colored structures are produced even with small proportions of this component.

The chiral components which have been preferably employed are diols derived from amino acids, chiral hydroquinones, camphoric acids, chiral adipic acid derivatives and propanediols. These chiral components are still, however, unsatisfactory with regard to their helical twisting ability.

SUMMARY OF THE INVENTION

It is an object of the present invention to provide novel chiral nematic polyesters with highly twisting chiral diol components with broader liquid crystalline phase ranges, which reflect selectively in the wavelength range of visible light even with a small proportion of the chiral component.

We have found that this object is achieved by the chiral nematic polyesters mentioned at the outset.

DETAILED DESCRIPTION OF THE INVENTION

Preferred chiral diol components are the dianhydrosugars derived from carbohydrates, in particular dianhydrosorbitol and dianhydromannitol. Dianhydrosorbitols have to date been used only for preparing non-liquid crystalline polycarbonates (DE 29 38 464 A1) or polyesters (GB 10 79 686).

Suitable dicarboxylic acid components in the chiral nematic polyesters are dicarboxylic acids containing various mesogenic groups. Preferred dicarboxylic acid residues are listed below.

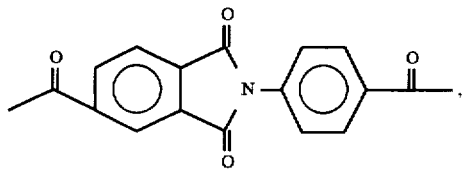

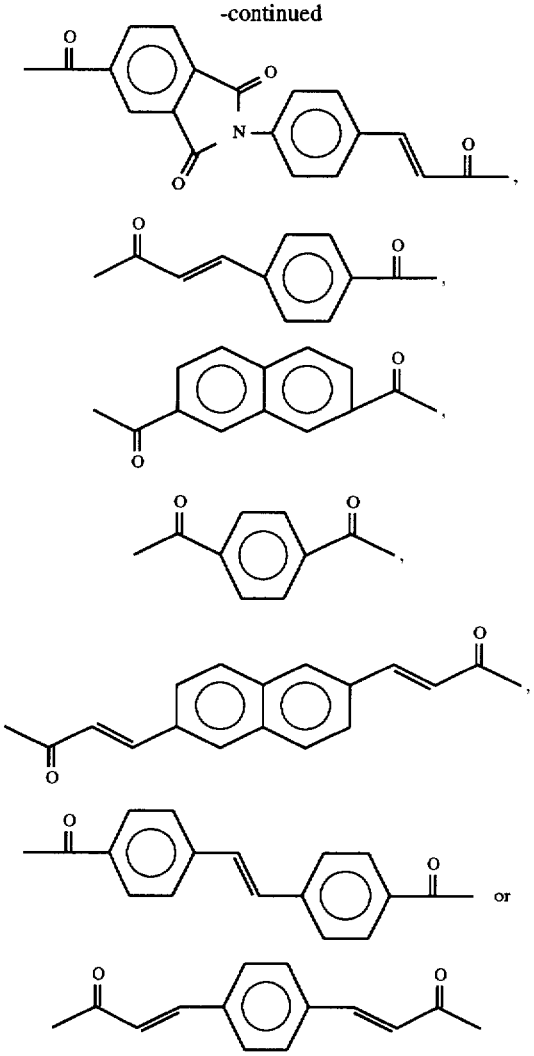

The alcohol component and the acid component are normally employed in approximately equimolar amounts for the synthesis.

Besides said chiral diol structural units, the polyesters according to the invention may also contain other diol units. Preferred co-units with a nonchiral diol structure are compounds of the formula

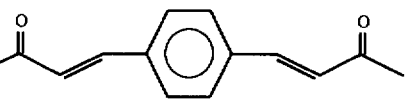

where A is a direct linkage, eg. a single bond, $(CH_2)_n$, O-alkylene, eg. $O(CH_2)_n$,

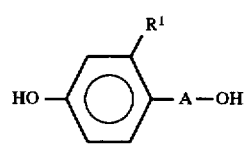

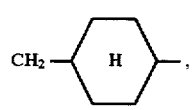

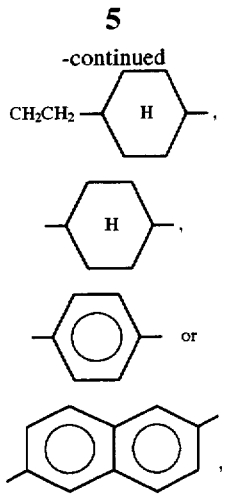

R¹ is hydrogen or phenyl and n is an integer from 1 to 15.

Sugar derivatives based on dianhydrosorbitol have a very great twisting ability. It is possible by suitable choice of the ratio between the chiral diol and a nonchiral diol, preferably phenylhydroquinone, to stabilize the liquid crystalline phase ranges beyond 450° C. (Table 1, Example 1).

The proportion of the chiral diol structural units is preferably from 1 to 80 mol % of the total content of diol structural units, particularly preferably from 2 to 20 mol %, depending on the required interference hue.

Particularly preferred polycondensates are those with dianhydrosorbitol and phenylhydroquinone in varying ratios as diol component and dicarboxylic acids such as

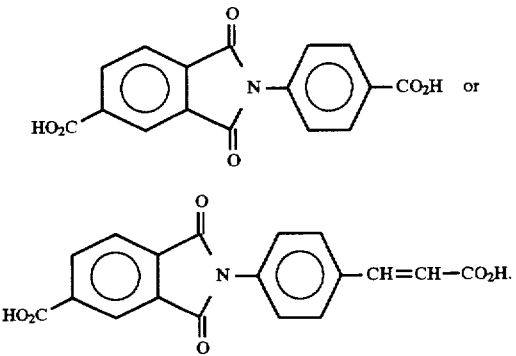

The chiral nematic polyesters obtained by polycondensation can be crosslinked by photocycloaddition, whereby the optical properties of the material can be fixed at variable temperatures. Polymers with cinnamic acid groups are photochemically active and can be crosslinked by a [2+2] photocycloaddition. This crosslinking preferably takes place at wavelengths from 200 to 450 nm.

Likewise particularly preferred are copolycondensates containing dicarboxylic acids of the formula

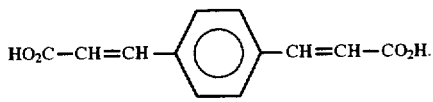

The polymers according to the invention are particularly suitable as surface-coating materials, as optical components and as chiral nematic coloring agents. They can be used as coloring system for coating surfaces (eg. as automobile paint), or else for producing colored pigments. The coloring structure of the polymer can moreover be fixed by rapid cooling or photochemical crosslinking of the chiral nematic phase. Colored pigments can be produced, for example, by detaching the oriented polymer film from the coated surface and grinding to pigments in platelet form. In contrast to the processes described in DE-A 42 40 743, crosslinking of the polymer is not absolutely necessary in this case. The polymer can moreover be used as coating system as powder, in the melt or in solution (eg. in N-methylpyrroliione or dimethylformamide). The system is oriented in the simplest case by heat treatment of the coated surface, and the orientation can be improved where appropriate by the action of mechanical, electrical or magnetic forces.

EXAMPLE 1

N-(4-Carboxyphenyl)trimellitic imide dichloride (20 mmol), phenylhydroquinone (10 mmol) and isosorbitol (10 mmol) were refluxed in o-dichlorobenzene (25 ml) for 18 h. After the reaction mixture had cooled it was stirred into methanol, and the precipitate was filtered off.

The following polymers were prepared by varying the ratio between phenylhydroquinone and isosorbitol

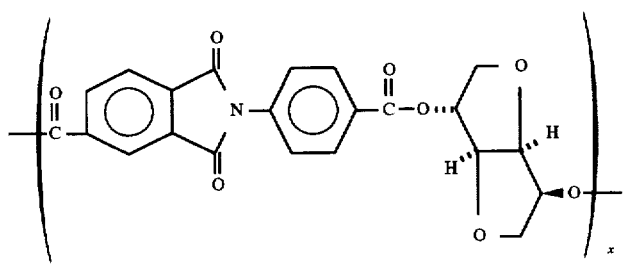

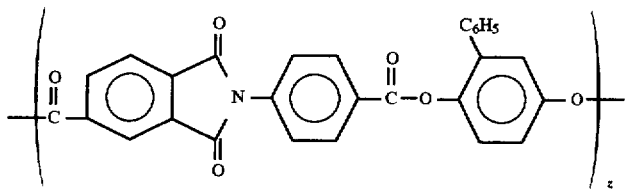

| Polymer | X/Z ratio | Yield (%) |
|---|---|---|
| a | 50/50 | 97 |
| b | 40/60 | 85 |
| c | 30/70 | 87 |
| d | 20/80 | 93 |
| e | 10/90 | 63 |
| f | 5/95 | 91 |

Comparative examples with X/Z 100/0 and 0/100 show no chiral nematic phases.

Table 1 indicates the physical properties (inherent viscosity ($\eta_{inh}$), optical rotation ($[\alpha]_D$), melting point ($T_m$), glass transition temperature ($T_g$) and clearing point ($T_i$)), the observed textures of the LC phases and the interference colors of polymers a to f.

TABLE 1

| Polymer | $\eta_{inh}^{1)}$ (dl/g) | $[\alpha]_D^{2)}$ [degrees] | $T_g^{3)}$ (°C.) | $T_i^{4)}$ (°C.) | Texture | Color |
|---|---|---|---|---|---|---|
| a | 0.56 | −116.4 | 200 | 200–300 | chiral nematic | UV |
| b | 1.13 | −91.9 | 202 | 360–375 | " | UV |
| c | 0.74 | −70.1 | 192 | 420–440 | " | UV |
| d | 0.83 | −44.0 | 193 | >450 | " | UV |
| e | 1.47 | −26.1 | 195 | >450 | " | blue |
| f | 0.78 | −9.6 | 195 | >450 | " | red |

1) Measured at 20° C., c = 2 g/l in methylene chloride/trifluoroacetic acid (4/1)
2) Measured at 20° C., c = 5 g/l in methylene chloride/trifluoroacetic acid (4/1)
3) DSC measurements, heating rate 20° C./minute (2nd heating plot)
4) polarizing microscope, heating rate 10° C./minute

We claim:

1. A chiral nematic polyester comprising as alcohol component chiral diol structural units of the formula

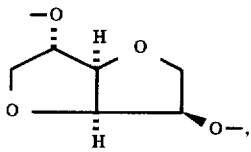

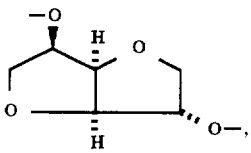

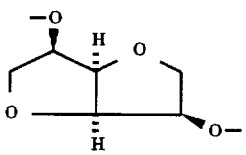

-continued

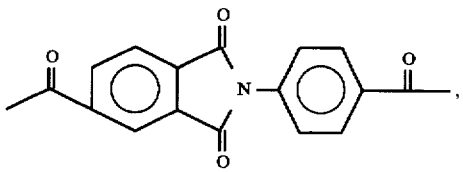

where the L radicals are independently of one another $C_1$–$C_4$-alkyl, $C_1$–$C_4$-alkoxy, halogen, COOR, OCOR, CONHR or NHCOR, and R is $C_1$–$C_4$-alkyl or hydrogen, and as acid component dicarboxylic acid residues comprising mesogenic groups.

2. A chiral nematic polyester as claimed in claim 1 which comprises as acid component acid residues of the formula

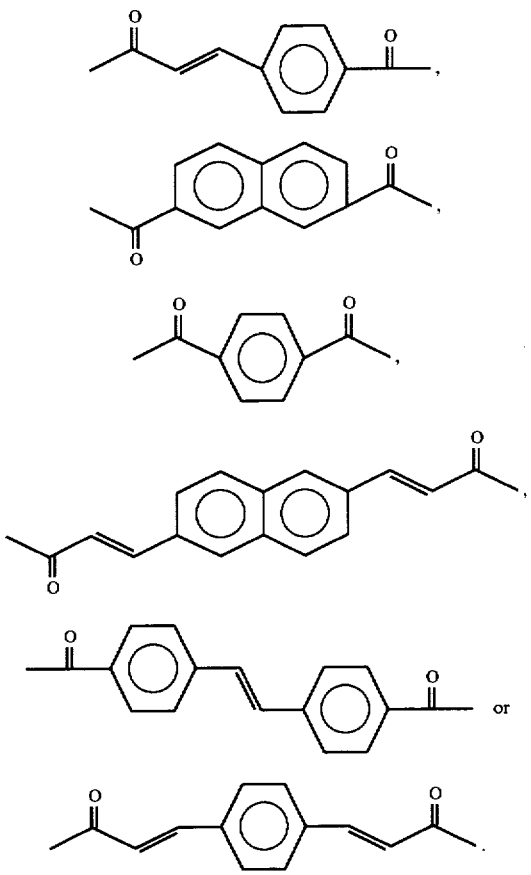

3. A chiral nematic polyester as claimed in claim 1, which comprises besides the diol structural units as set forth in claim 1 diol residues of the formula

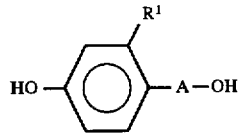

where A is a direct linkage, $(CH_2)_n$, O-alkylene,

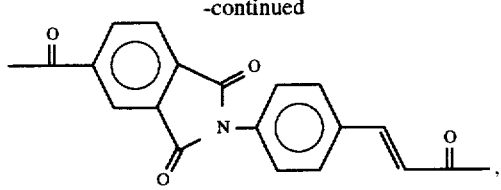

$R^1$ is hydrogen or phenyl and n is an integer from 1 to 15.

4. A chiral nematic polyester as claimed in claim 3, wherein the proportion of chiral diol structural units as set forth in claim 1 is from 1 to 80 mol % of the total content of diol structural units.

5. A chiral nematic polyester as claimed in claim 1, wherein the acid components comprise crosslinkable groups.

6. A chiral nematic polyester as claimed in claim 5, which comprises photochemically crosslinkable groups.

7. A pigment with a cholesteric liquid crystalline order structure comprising a chiral nematic polyester as claimed in claim 1.

8. A method of coating and/or coloring a surface comprising applying the chiral nematic polyester as claimed in claim 1 to the surface.

* * * * *